(12) United States Patent
Cheong et al.

(10) Patent No.: US 8,729,757 B2
(45) Date of Patent: May 20, 2014

(54) SPINDLE MOTOR

(71) Applicant: Samsung Electro-Mechanics Co., Ltd., Gyeonggi-do (KR)

(72) Inventors: Shin Young Cheong, Suwon (KR); Hyun Chul Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/949,944

(22) Filed: Jul. 24, 2013

(65) Prior Publication Data

US 2013/0307379 A1    Nov. 21, 2013

Related U.S. Application Data

(63) Continuation of application No. 13/591,785, filed on Aug. 22, 2012, now Pat. No. 8,552,606.

(30) Foreign Application Priority Data

Mar. 29, 2012   (KR) .................. 10-2012-0032342
Jun. 12, 2012   (KR) .................. 10-2012-0062637

(51) Int. Cl.
  *H02K 5/16*   (2006.01)
(52) U.S. Cl.
  USPC .......................................... 310/90; 310/67 R
(58) Field of Classification Search
  USPC ............................................ 310/67 R, 89–90
  See application file for complete search history.

(56) References Cited

U.S. PATENT DOCUMENTS

| | | | |
|---|---|---|---|
| 6,211,592 B1 | 4/2001 | Ichiyama | |
| 6,828,709 B2 | 12/2004 | Grantz et al. | |
| 7,023,116 B2 * | 4/2006 | Kuribara | 310/90 |
| 7,109,620 B2 * | 9/2006 | Fujii et al. | 310/90 |
| 7,265,469 B2 | 9/2007 | Kodama | |
| 7,489,059 B2 | 2/2009 | Yajima | |
| 7,541,708 B2 * | 6/2009 | Ishikawa et al. | 310/90 |
| 7,667,360 B2 | 2/2010 | Fukushima | |
| 2002/0003678 A1 | 1/2002 | Sakuragi et al. | |
| 2002/0080711 A1 | 6/2002 | Han | |
| 2002/0185925 A1 | 12/2002 | Yoshikawa et al. | |
| 2004/0113501 A1 | 6/2004 | Tokunaga et al. | |
| 2004/0135447 A1 * | 7/2004 | Lee et al. | 310/90 |
| 2004/0189113 A1 * | 9/2004 | Kuribara | 310/67 R |
| 2005/0104464 A1 * | 5/2005 | Fujii et al. | 310/90 |

(Continued)

FOREIGN PATENT DOCUMENTS

JP    2000-350408    12/2000
JP     2001-27225     1/2001

(Continued)

OTHER PUBLICATIONS

Korean Notice of Allowance issued Oct. 5, 2012 for corresponding Korean Application No. 10-2012-0062637.

(Continued)

*Primary Examiner* — Thanh Lam (57) ABSTRACT

A spindle motor includes a shaft; a first sleeve rotatably supporting the shaft by fluid dynamic pressure; a second sleeve provided outwardly of the first sleeve; a stator core mounted on an outer surface of the second sleeve; and a base member including a mounting part protruding upwardly in an axial direction and fixed to at least one of the first and second sleeves.

11 Claims, 4 Drawing Sheets

(56) References Cited

U.S. PATENT DOCUMENTS

| | | | |
|---|---|---|---|
| 2005/0135003 A1 | 6/2005 | Inoue et al. | |
| 2005/0140220 A1 | 6/2005 | Tsuda et al. | |
| 2005/0141789 A1 | 6/2005 | Kita et al. | |
| 2005/0243461 A1 | 11/2005 | Kitamura et al. | |
| 2005/0270693 A1 | 12/2005 | Rehm et al. | |
| 2007/0013249 A1 | 1/2007 | Engesser et al. | |
| 2007/0171569 A1 | 7/2007 | Burns et al. | |
| 2007/0236091 A1 | 10/2007 | Fukushima | |
| 2007/0241643 A1* | 10/2007 | Watanabe et al. | 310/67 R |
| 2007/0274002 A1 | 11/2007 | Kim et al. | |
| 2009/0115277 A1 | 5/2009 | Yajima | |
| 2009/0152968 A1* | 6/2009 | Ishikawa et al. | 310/90 |
| 2010/0053807 A1 | 3/2010 | LeBlanc et al. | |
| 2010/0289385 A1 | 11/2010 | Smirnov et al. | |
| 2012/0013213 A1 | 1/2012 | Kim | |
| 2012/0043842 A1 | 2/2012 | Choi | |
| 2012/0306303 A1 | 12/2012 | Kim et al. | |

FOREIGN PATENT DOCUMENTS

| | | |
|---|---|---|
| JP | 3263109 | 12/2001 |
| JP | 2005-143227 | 6/2005 |
| JP | 2005/172223 | 6/2005 |
| JP | 2007-198555 | 8/2007 |
| KR | 10-0749028 | 8/2007 |
| KR | 10-2010-0123461 | 11/2010 |
| KR | 10-2011-0062776 | 6/2011 |

OTHER PUBLICATIONS

Korean Office Action issued Jun. 27, 2012 for corresponding Korean Application No. 10-2012-0062637.

U.S. Notice of Allowance issued Jul. 9, 2013 in copending U.S. Appl. No. 13/591,785.

U.S. Appl. No. 13/591,785, filed Aug. 22, 2012, Shin Young Cheong, Samsung Electro-Mechanics Co., Ltd.

U.S. Office Action issued Mar. 3, 2014 in corresponding U.S. Appl. No. 13/564,390.

U.S. Office Action issued Oct. 24, 2013 in corresponding U.S. Appl. No. 13/564,290.

Japanese Office Action issued Oct. 22, 2013 in corresponding Japanese Application No. 2012-181516.

* cited by examiner

SPINDLE MOTOR

CROSS-REFERENCE TO RELATED APPLICATIONS

This application is a continuation of application Ser. No. 13/591,785, filed on Aug. 22, 2012, which claims the priority of Korean Patent Applications No. 10-2012-0032342 filed on Mar. 29, 2012 and Korean Patent Application No. 10-2012-0062637 filed on Jun. 12, 2012, in the Korean Intellectual Property Office, the disclosures of which are incorporated herein by references.

BACKGROUND

1. Field

The present invention relates to a spindle motor.

2. Description of the Related Art

A hard disk drive (HDD), an information storage device, reads data stored on a disk or writes data to a disk using a read/write head.

The hard disk drive requires a disk driving device capable of driving a disk. In the disk driving device, a small spindle motor is used.

This small-sized spindle motor has used a hydrodynamic bearing assembly. A shaft, a rotating member of the hydrodynamic bearing assembly, and a sleeve, a fixed member thereof, have a lubricating fluid interposed therebetween, such that the shaft is supported by pressure generated in the lubricating fluid.

In addition, a rotor hub rotating together with the shaft and having a recording disk mounted thereon may be disposed on an upper portion of the shaft, and the rotor hub is fixedly coupled to the upper portion of the shaft and has a disk shape in which it is extended in a radial direction based on the shaft. Therefore, the lubricating fluid may also be interposed between an upper surface of the sleeve and the rotor hub.

According to the related art, in manufacturing a base provided in the hard disk drive, a post-processing scheme of die-casting aluminum (Al) and then removing burrs or the like, generated due to the die-casting process has been used.

However, in the die-casting scheme according to the related art, since a process of injecting aluminum (Al) in a molten state into a mold to make a form is performed, large amounts of temperature and pressure are required, such that a large amount of energy may be required in the process and processing time and costs may be increased.

Therefore, in order to solve the problems of the die-casting process, an attempt to manufacture the base through a plastic working process such as press working, or the like, has been conducted. However, in the case of manufacturing the base by press working, since the base may have a uniform thickness, a problem may be generated in coupling a core to the base.

That is, in the case in which a base is manufactured in a die-casting process, the base may be provided with a step, so as to seat the core thereon. However, in the case in which a base is manufactured by pressing a plate material having a uniform thickness, since the thickness of the base is uniform, it may be difficult to form a core seating part on the base.

Japanese Patent Laid-Open Publication No. 2007-198555 discloses that a die-casting base is provided with a step to seat a core thereon.

SUMMARY OF THE INVENTION

An aspect of the present invention provides a spindle motor in which a core may be stably and easily seated on a base manufactured by plastic working such as press working, or the like.

According to an aspect of the present invention, there is provided a spindle motor including: a shaft; a first sleeve rotatably supporting the shaft by fluid dynamic pressure; a second sleeve provided outwardly of the first sleeve; a stator core mounted on an outer surface of the second sleeve; and a base member including a mounting part protruding upwardly in an axial direction and fixed to at least one of the first and second sleeves.

The second sleeve may be provided with a core seating part protruding outwardly and having the stator core seated thereon.

An upper surface or a lower surface of the stator core may be bonded to the core seating portion.

The shaft may include a hub coupled to an upper end thereof, a thrust dynamic pressure bearing may be formed between the hub and a surface of the first sleeve facing the hub, a radial dynamic pressure bearing may be formed between the shaft and a surface of the first sleeve facing the shaft, and parallelism between a surface of the core seating part on which the core is seated and the surface of the first sleeve in which the thrust dynamic pressure bearing is formed may be 50 μm or less.

The shaft may include a hub coupled to an upper end thereof, a thrust dynamic pressure bearing may be formed between the hub and a surface of the first sleeve facing the hub, a radial dynamic pressure bearing may be formed between the shaft and a surface of the first sleeve facing the shaft, perpendicularity between a surface of the core seating portion on which the core is seated and the surface of the first sleeve in which the radial dynamic pressure bearing is formed may be 50 μm or less.

The shaft may include a hub coupled to an upper end thereof, the hub including a main wall portion extended downwardly in the axial direction so as to have an inner surface facing at least a portion of an outer surface of the first sleeve and an outer surface facing at least a portion of an inner surface of the second sleeve.

The outer surface of the main wall portion and the inner surface of the second sleeve may form a labyrinth seal.

The mounting portion may be fitted between the first and second sleeves.

The mounting portion may be coupled to the second sleeve, and an outer surface of a lower end of the first sleeve may be inclined inwardly from an upper portion thereof toward a lower portion thereof.

The first and second sleeves may include at least one oil injection hole penetrating therebetween in the axial direction.

The first and second sleeves may be formed integrally with each other.

The base member may be formed by performing plastic working on a rolling steel sheet.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

Embodiments of the present invention will now be described in detail with reference to the accompanying drawings. However, it should be noted that the spirit of the present invention is not limited to the embodiments set forth herein and that those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, when it is determined that the detailed description of the known art related to the present invention may obscure the gist of the present invention, the detailed description thereof will be omitted.

Figure 1:
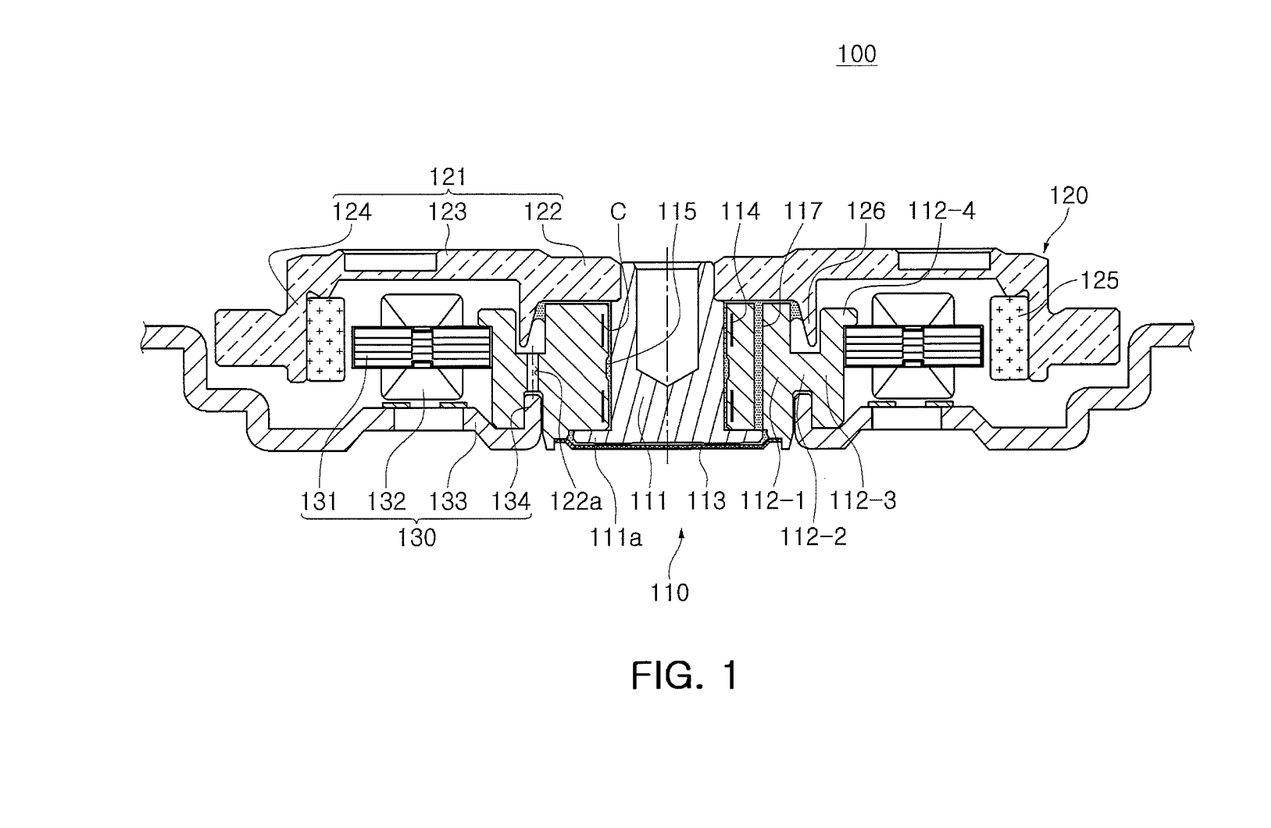
FIGS. 1 through 3 are schematic cross-sectional views showing a spindle motor according to embodiments of the present invention.

FIG. 1 is a schematic cross-sectional view showing a spindle motor according to an embodiment of the present invention.

Referring to FIG. 1, a spindle motor 100 according to the embodiment of the present invention may include a hydrodynamic bearing assembly 110 including a shaft 111, a first sleeve 112-1, a rotor hub 121, a stopper 111a, and a cover member 113, a rotor 120 including the rotor hub 121, and a stator 130 including a core 131 having a coil 132 wound therearound.

The hydrodynamic bearing assembly 110 may include the rotor hub 121. Here, the rotor hub 121 may be a component configuring the hydrodynamic bearing assembly 110 while configuring the rotor 120 to be described below.

In addition, a rotating member assembly may include the shaft 111 and the rotor hub 121 mounted on the shaft 111.

In addition, a sleeve 112 may include the first sleeve 112-1 and a second sleeve 112-3 to be described below.

Terms with respect to directions will first be defined. As viewed in FIG. 1, an axial direction refers to a vertical direction based on the shaft 111, and an outer radial direction and an inner radial direction refers to a direction toward an outer edge of the rotor hub 121 based on the shaft 111 and a direction toward the center of the shaft 111 based on the outer edge of the rotor hub 121, respectively.

Further, in the following description, a rotating member may include a rotating member such as the shaft 111, the rotor 120 including the rotor hub 121, a magnet 125 mounted on the rotor 120, and the like, while a fixed member may include members other than the rotating member and relatively fixed to the rotating member, such as the first sleeve 112-1, the second sleeve 112-3, the stator 130, a base member 133, and the like.

In addition, a communication path between an interface of a lubricating fluid and the outside means a path through which the interface of the lubricating fluid is connected to the outside of the spindle motor and may have air introduced and discharged therethrough.

The first sleeve 112-1 may support the shaft 111 so that an upper end of the shaft 111 protrudes upwardly in an axial direction. The first sleeve 112-1 may be formed by forging Cu or Al or sintering a Cu—Fe-based alloy powder or a SUS-based powder. However, the sleeve is not limited to being manufactured by the above-mentioned method, but may be manufactured by various methods.

Here, the shaft 111 may be inserted into a shaft hole of the first sleeve 112-1 so as to have a micro clearance therebetween, thereby forming a bearing clearance C. The bearing clearance C may be filled with the lubricating fluid (or oil) (hereinafter, both "lubricating fluid" and "oil" are used interchangeably). At least one of an outer diameter of the shaft 111 and an inner diameter of the first sleeve 112-1 may be provided with upper and lower radial dynamic pressure grooves 114. At the time of rotation of the rotor 120, a radial bearing may be generated by the radial dynamic pressure groove 114, and the rotor may rotate smoothly due to the radial bearing.

The spindle motor 100 according to the embodiment of the present invention may use a fluid bearing and generally include a pair of upper and lower radial dynamic pressure grooves for rotational stability, such that two hydrodynamic bearings may be formed when the motor is driven.

That is, the radial dynamic pressure grooves 114 may generate fluid dynamic pressure at the time of the rotation of the shaft 111 so that the shaft 111 may rotate smoothly in a state in which the shaft is spaced apart from the first sleeve 112-1 by a predetermined interval, thereby serving as a bearing.

However, the radial dynamic pressure grooves 114 are not limited to being formed in the inner side of the first sleeve 112-1 as described above, but may also be formed in an outer diameter portion of the shaft 111. In addition, the number of radial dynamic pressure grooves 114 is not limited.

Here, the radial dynamic pressure groove 114 may have any one of a herringbone shape, a spiral shape, and a helical shape. However, the radial dynamic pressure groove 114 may have any shape as long as radial dynamic pressure may be generated thereby.

The first sleeve 112-1 may be provided with a circulation hole 117 allowing upper and lower portions thereof to be in communication with each other. The circulation holes 117 may disperse pressure of the lubricating fluid in the hydrodynamic bearing assembly 110 to maintain balance in the pressure of the lubricating fluid and allow air bubbles, or the like, present in the inner portion of the hydrodynamic bearing assembly 110 to move so as to be discharged by circulation.

Here, the shaft 111 may include the stopper 111a provided on a lower end portion thereof and protruding in the outer radial direction, and the stopper 111a may be caught by a lower end surface of the first sleeve 112-1 to limit floatation of the shaft 111 and the rotor 120.

Meanwhile, a groove shaped reservoir part 115 may be formed in at least one of the first sleeve 112-1 and the shaft 111 between the upper and lower radial dynamic pressure grooves 114 so that the bearing clearance between the first sleeve 112-1 and the shaft 112 may be wider therein, as compared to other portions. Although the case in which the reservoir part 115 is provided on an inner peripheral surface of the first sleeve 112-1 in a circumferential direction is shown in FIG. 1, the present invention is not limited thereto. The reservoir part 115 may be provided on an outer peripheral surface of the shaft 111 in the circumferential direction.

In addition, the first sleeve 112-1 may include a thrust dynamic pressure groove formed in an upper surface thereof to generate thrust dynamic pressure at the time of the rotation of the shaft. The thrust dynamic pressure groove is not limited to being formed in the first sleeve 112-1, but may also be formed in the rotor hub 121 facing the upper surface of the first sleeve 112-1. The thrust dynamic pressure groove may have various shapes, such as a spiral shape, a herringbone shape, a helical shape, and the like.

Meanwhile, the cover member 113 may be coupled to the lower portion of the first sleeve 112-1 in the axial direction while covering the shaft hole of the first sleeve 112-1 to prevent leakage of the lubricating fluid.

Here, the cover member 113 may receive the lubricating fluid in a clearance formed between a lower surface of the shaft 111 and the cover member 113, thereby serving as a bearing supporting the lower surface of the shaft 111 at the time of the rotation of the shaft 111.

The second sleeve 112-3 may be provided on an outer surface of the first sleeve 112-1. The first sleeve 112-1 positioned at the inner side of the second sleeve 112-3 may serve to support the shaft 111 and form the hydrodynamic bearing assembly, and the second sleeve 112-3 positioned at the outer side of the first sleeve 112-1 may serve to fix a stator core 131 to be described below.

A main wall part 126 extended from a rotor hub 121, to be described below, downwardly in the axial direction may have an inner surface facing at least a portion of the outer surface of the first sleeve 112-1 and an outer surface facing at least a portion of an inner surface of the second sleeve 112-3. That is, the main wall part 126 may be disposed between the first and second sleeves 112-1 and 112-3. In this case, the outer surface of the main wall part 126 and the inner surface of the sleeve 112-3 may form a labyrinth seal. Therefore, scattering or leakage of the oil may be significantly reduced.

More specifically, the first and second sleeves 112-1 and 112-3 may be connected to each other through a connecting part 112-2. The connecting part 112-2 indicates a portion at which the first and second sleeves 112-1 and 112-3 are connected to each other.

Here, the connecting part 112-2 may have an axial length shorter than those of the first and second sleeves 112-1 and 112-3 and connect the first and second sleeves 112-1 and 112-3 to each other at an approximately central portion thereof in the axial direction. Therefore, upper and lower spaces between the first and second sleeves 112-1 and 112-3 may be formed based on the connecting part 113.

Meanwhile, the first and second sleeves 112-1 and 112-3 may be formed separately from or integrally with each other. That is, the first sleeve 112-1 and the connecting part 112-2, the connecting part 112-2 and the second sleeve 112-3, or the first sleeve 112-1, the connecting part 112-2, and the second sleeve 112-3 are formed integrally with each other, whereby the number of components may be reduced. When the number of components is reduced, a product may be manufactured by a single cutting process without coupling between components, so that a coupling tolerance according to coupling between components may not be generated, and thus, a coupling degree of the product may be increased. The first sleeve 112-1, the connecting part 112-2, and the second sleeve 112-3 may be formed of the same material.

In addition, the first and second sleeves 112-1 and 112-2 may include at least one oil injecting hole 112a penetrating therebetween in the axial direction. More specifically, the connecting part 112-2 which is a connection portion of the first and second sleeves 112-1 and 112-2 may include at least one oil injecting hole 112a penetrating therethrough in the axial direction.

Here, the axial direction may include the same direction as the axial direction or a slightly inclined direction. The oil injecting hole 112a is provided to complete the hydrodynamic bearing assembly 100 and allow oil to be easily injected into the bearing clearance C. The oil may also be injected into the bearing clearance C by other methods, without using the oil injecting hole 112a.

Further, an upper end of the second sleeve 112-3 is provided with a core seating part 112-4 protruding outwardly to allow an upper portion of the core 131 to be caught, such that a fixed position of the core may be guided. The core 131 may be bonded to the core seating part 112-4.

In this case, parallelism between a surface of the core seating part 112-4 on which the core 131 is seated and the upper surface of the first sleeve 112-1 in which the thrust dynamic pressure bearing is formed may be 50 μm or less, and perpendicularity between the surface of the core seating part 112-4 on which the core 131 is seated and the inner surface of the first sleeve 112-1 in which the radial dynamic pressure bearing is formed may be 50 μm or less. That is, error ranges of the parallelism and the perpendicularity may be 50 μm or less. In the case in which the first and second sleeves 112-1 and 112-3 are formed integrally with each other, it may be easy to process the first and second sleeves 112-1 and 112-3 simultaneously to reduce the error range.

In addition, a mounting part 134 protruding from the base member 133 upwardly in the axial direction may be fixed to at least one of the first and second sleeves 112-1 and 112-3. In more detail, the mounting part 134 may be fitted into and coupled to the space formed between the first and second sleeves 112-1 and 112-3. That is, the mounting part 134 may be fitted into the space formed between the first and second sleeves 112-1 and 112-3.

In the case in which the mounting part 134 is fitted into and coupled to the space formed between the first and second sleeves 112-1 and 112-3, the mounting part 134 may be bonded to at least one of the first and second sleeves 112-1 and 112-3. That is, a bond is applied to the space formed between the first and second sleeves 112-1 and 112-3, and the mounting part 134 may be slid and coupled to the space to thereby be fixed thereto. In the case, the bond may be applied to at least any one of the first and second sleeves 112-1 and 112-3.

Further, the coupling method is not limited to the sliding or bonding method but may also use a press-fitting method, a welding method, or the like. In the case of the press-fitting method, the mounting part 134 may be press-fitted into at least one of the first and second sleeves 112-1 and 112-3.

The rotor hub 121, a rotating member coupled to the shaft 111 and rotating together with the shaft 111, may configure the rotor 120 while configuring the hydrodynamic bearing assembly 110. Hereinafter, the rotor 120 will be described in detail.

The rotor 120 may be a rotating structure provided to be rotatable with respect to the stator 130 and include the rotor hub 121 having the magnet 125 provided on an inner peripheral surface thereof and having an annular ring-shape, wherein the annular ring-shaped magnet 125 corresponds to the core 131 to be described below, having a predetermined interval therebetween.

In other words, the rotor hub 121 may be a rotating member coupled to the shaft 111 to rotate together with the shaft 111. Here, the shaft 111 and the rotor hub 121 may include an adhesive applied therebetween to thereby be fixed to each other. However, the shaft 111 and the rotor hub 121 are not limited to being fixed to each other in the above-mentioned method, but may be fixed to each other in various fixing methods such as a welding method, a press-fitting method, and the like.

Here, the magnet 125 may be a permanent magnet generating magnetic force having predetermined strength by alternately magnetizing an N pole and an S pole thereof in a circumferential direction.

In addition, the rotor hub 121 may include a first cylindrical wall part 122 fixed to an upper end portion of the shaft 111, a disk part 123 extended from an end portion of the first cylindrical wall part 122 in the outer radial direction, and a second cylindrical wall part 124 protruding downwardly from an end portion of the disk part 123 in the outer radial direction. The second cylindrical wall part 124 may include the magnet 125 coupled to an inner peripheral surface thereof.

The rotor hub 121 may include the main wall part 126 extended downwardly in the axial direction so as to correspond to an outer portion of the upper portion of the sleeve 112. In more detail, the rotor hub 121 may include the main wall part 126 extended from the disk part 123 downwardly in the axial direction and disposed between the first and second sleeves 112-1 and 112-3.

A liquid-vapor interface sealing the lubricating fluid may be formed between the outer surface of the first sleeve 112-1 and the inner surface of the main wall part 126. In addition, the labyrinth seal may be formed between the inner surface of the second sleeve 112-3 and the outer surface of the main wall part.

Further, the inner surface of the main wall part 126 may be tapered, such that an interval between the inner surface of the main wall part 126 and the outer surface of the first sleeve 112-1 may grow wider downwardly in the axial direction, so as to facilitate the sealing of the lubricating fluid. Further, the outer surface of the first sleeve 112-1 may also be tapered to facilitate the sealing of the lubricating fluid.

The stator 130 may include the coil 132, the stator core 131, and the base member 133.

In other words, the stator 130 may be a fixed structure including the coil 132 generating electromagnetic force having a predetermined magnitude when power is applied thereto, and a plurality of stator cores 131 having the coil 132 wound therearound.

The core 131 may be fixedly disposed above the base member 133 including a printed circuit board (not shown) having circuit patterns printed thereon, a plurality of coil holes having a predetermined size may be formed in the base member 133 corresponding to the wound coil 132 so as to penetrate through the base member 133 in order to expose the wound coil 132 downwardly, and the wound coil 132 may be electrically connected to the printed circuit board (not shown) so that external power may be supplied thereto.

Here, the base member 133 may include the mounting part 134 protruding upwardly in the axial direction.

The base member 133 may be manufactured by performing plastic working on a rolled steel sheet. More specifically, the base member 133 may be manufactured by a pressing method, a stamping method, a deep drawing method, or the like. However, the base member 133 is not limited to being manufactured by the above-mentioned methods, and may be manufactured by various methods that are not described herein.

The base member 133 may be assembled by fitting the mounting part 134 into the space formed between the first and second sleeves 112-1 and 112-3 and applying an adhesive to the space formed between the first and second sleeves 112-1 and 112-3.

Here, as a method of fixing the mounting part 134 thereto, a sliding method, a press-fitting method, or a welding method, as well as a bonding method, may be used.

Meanwhile, the core 131 having the coil 132 wound therearound may be fixedly coupled to the outer surface of the second sleeve 112-3. In this case, the upper end of the second sleeve 112-3 is provided with the core seating part 112-4 protruding outwardly therefrom to allow the core 131 to be caught at the upper portion thereof, such that the fixed position of the core may be guided.

Further, the core 131 may be fitted into and coupled to the outer surface of the second sleeve 112-3 after the bond is applied to the outer surface of the second sleeve 112-3. However, the core 131 is not limited to being fixed by the above-mentioned fixing method, but may be fixed by various fixing methods such as a sliding method, a press-fitting method, a welding method, and the like.

Figure 2:
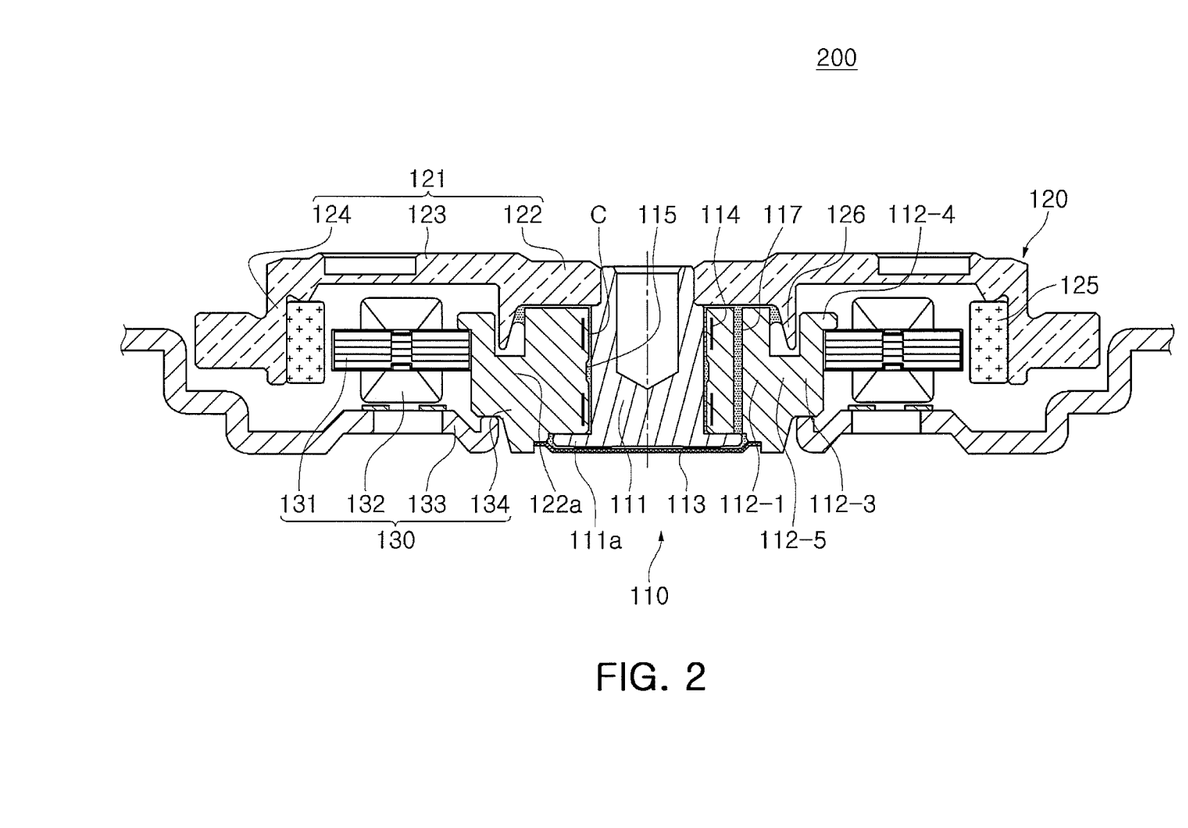

FIG. 2 is a schematic cross-sectional view showing a spindle motor according to another embodiment of the present invention.

Referring to FIG. 2, a spindle motor 200 according to another embodiment of the present invention may be different from the spindle motor 100 according to the embodiment of the present invention described with reference to FIG. 1, in terms of a shape of the connecting part connecting first and second sleeves 112-1 and 112-3 to each other. Therefore, the spindle motor 200 may be different in terms of a coupling shape between the first sleeve 112-1 and a base member 133 from the spindle motor 100. Therefore, a detailed description of the same structure and shape will be omitted in order to prevent confusion and make a description of the present invention clear. Hereinafter, features different from those of the spindle motor 100 described with reference to FIG. 1 will mainly be described.

A connecting part 112-5 used in the spindle motor 200 according to the embodiment of the present invention may connect the first and second sleeves 112-1 and 112-5 to each other. In addition, the connecting part 112-5 may have an axial length slightly shorter than those of the first and second sleeves 112-1 and 112-3.

However, the connecting part 112-5 may connect the first and second sleeves 112-1 and 112-5 to each other at a lower portion of the second sleeve 112-3 in the axial direction. Therefore, a space between the first and second sleeves 112-1 and 112-3 may be formed above the connecting part 112-5, but may not be formed thereunder.

Therefore, the mounting part 143 of the base member 133 may be mounted to face the lower surface of the second sleeve 112-3. An additional coupling method such as an adhesive bonding method, a sliding method, a welding method, or the like, may be similarly utilized. Since the mounting part 134 is coupled to the second sleeve 112-3, an outer surface of a lower end of the first sleeve 112-1 may be inclined inwardly from an upper portion thereof toward a lower portion thereof. Due to this shape, an adhesive may be easily applied thereto or welding may be easily performed.

Figure 3:
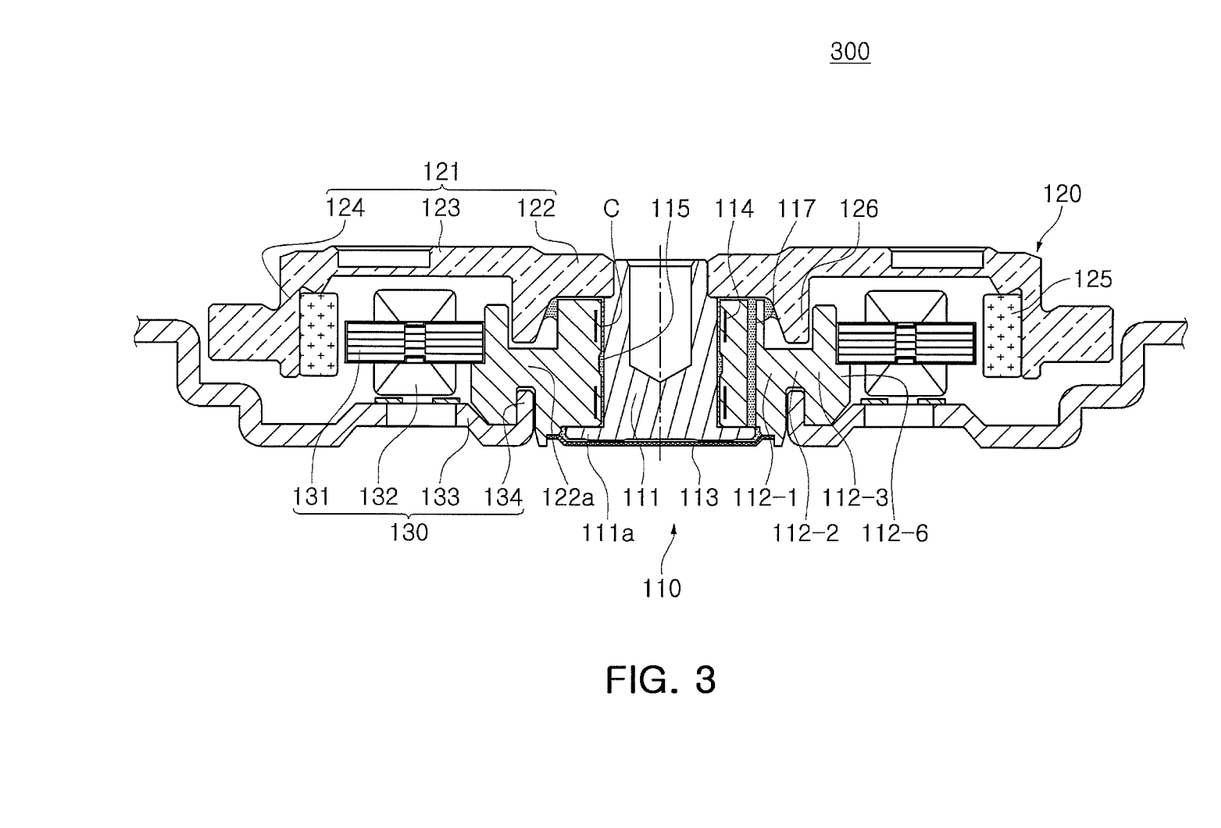

FIG. 3 is a schematic cross-sectional view showing a spindle motor according to another embodiment of the present invention.

Referring to FIG. 3, a spindle motor 300 according to the embodiment of the present invention may be different from the spindle motor 100 described above with reference to FIG. 1, in terms of a position of a core seating part 112-6 provided in the second sleeve 112-3. Therefore, a detailed description of the same structure and shape will be omitted in order to prevent confusion and make a description of the present invention clear. Hereinafter, features different from those of the spindle motor 100 described above with reference to FIG. 1 will be mainly described.

The core seating part 112-6 used in the spindle motor 300 according to another embodiment of the present invention protrudes outwardly from the second sleeve 112-3 to allow the lower portion of the stator core 131 to be caught, such that a fixed position of the stator core 131 may be guided thereby. That is, unlike the spindle motor 100 according to the embodiment of the present invention described with reference to FIG. 1, the core seating part 112-6 may be positioned lower than the stator core 131 in the axial direction. The core 131 may be bonded to the core seating part 112-6.

Although a shaft-rotating type structure in which the rotor hub is coupled to the shaft to rotate has been described in the embodiments of FIGS. 1 through 7, the present invention may also have a shaft-fixing type structure in which the rotor hub is coupled to the sleeve to rotate.

Figure 4:
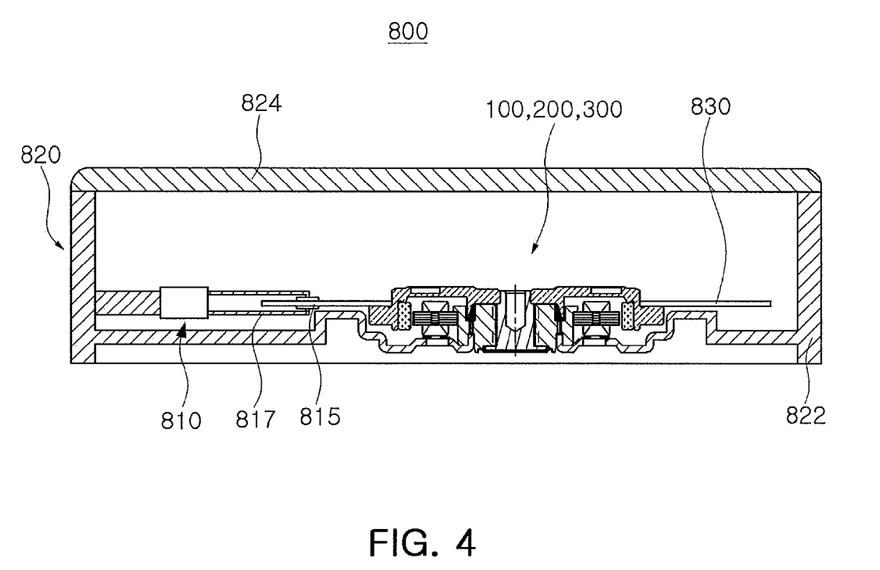
FIG. 4 is a schematic cross-sectional view of a disk driving device using a spindle motor according to an embodiment of the present invention.

FIG. 4 is a schematic cross-sectional view of a disk driving device using a spindle motor according to an embodiment of the present invention.

Referring to FIG. 4, a recording disk driving device 800 having the spindle motor 100, 200, or 300 according to the embodiment of the present invention mounted therein is a hard disk driving device and may include the spindle motor 100, 200, or 300, a head transfer part 810, and a housing 820.

The spindle motor 100, 200, or 300 may have all the characteristics of the spindle motor according to the embodiments of the present invention described above and may have a recording disk 830 mounted thereon.

The head transfer part 810 may transfer a magnetic head 815 detecting information of the recording disk 830 mounted on the spindle motor 100, 200, or 300 to a surface of the recording disk from which information is to be read. Here, the magnetic head 815 may be disposed on a support part 817 of the head transfer part 810.

The housing 820 may include a motor mounting plate 822 and a top cover 824 shielding an upper portion of the motor mounting plate 822 in order to form an internal space receiving the spindle motor 100, 200, or 300 and the head transfer part 810 therein.

As set forth above, in the spindle motor according to the embodiment of the present invention, the core may be stably and easily seated on the base manufactured by the plastic working such as press working, or the like.

While the present invention has been shown and described in connection with the embodiments, it will be apparent to those skilled in the art that modifications and variations can be made without departing from the spirit and scope of the invention as defined by the appended claims.

The invention claimed is:

1. A spindle motor comprising:
   a shaft;
   a first sleeve rotatably supporting the shaft by fluid dynamic pressure;
   a second sleeve provided outwardly of the first sleeve;
   a stator core mounted on an outer surface of the second sleeve; and
   a base member including a mounting part protruding upwardly in an axial direction and fixed to at least one of the first and second sleeves,
   wherein the spindle motor includes a hub coupled to an upper end of the shaft, the hub including a main wall portion extended downwardly in the axial direction so as to have an inner surface facing at least a portion of an outer surface of the first sleeve and an outer surface facing at least a portion of an inner surface of the second sleeve.

2. The spindle motor of claim 1, wherein the second sleeve is provided with a core seating part protruding outwardly and having the stator core seated thereon.

3. The spindle motor of claim 2, wherein an upper surface or a lower surface of the stator core is bonded to the core seating part.

4. The spindle motor of claim 2, wherein the shaft includes a hub coupled to an upper end thereof, a thrust dynamic pressure bearing is formed between the hub and a surface of the first sleeve facing the hub, a radial dynamic pressure bearing is formed between the shaft and a surface of the first sleeve facing the shaft, and parallelism between a surface of the core seating part on which the core is seated and the surface of the first sleeve in which the thrust dynamic pressure bearing is formed is 50 μm or less.

5. The spindle motor of claim 2, wherein the shaft includes a hub coupled to an upper end thereof, a thrust dynamic pressure bearing is formed between the hub and a surface of the first sleeve facing the hub, a radial dynamic pressure bearing is formed between the shaft and a surface of the first sleeve facing the shaft, and perpendicularity between a surface of the core seating part on which the core is seated and the surface of the first sleeve in which the radial dynamic pressure bearing is formed is 50 μm or less.

6. The spindle motor of claim 1, wherein the outer surface of the main wall part and the inner surface of the second sleeve form a labyrinth seal.

7. The spindle motor of claim 1, wherein the mounting part is fitted between the first and second sleeves.

8. The spindle motor of claim 1, wherein the mounting part is coupled to the second sleeve, and an outer surface of a lower end of the first sleeve is inclined inwardly from an upper portion thereof toward a lower portion thereof.

9. The spindle motor of claim 1, wherein the first and second sleeves includes at least one oil injection hole penetrating therebetween in the axial direction.

10. The spindle motor of claim 1, wherein the first and second sleeves are formed integrally with each other.

11. The spindle motor of claim 1, wherein the base member is formed by performing plastic working on a rolling steel sheet.

* * * * *